G. W. W. CORNMAN.
ELECTRICAL INSTRUMENT.
APPLICATION FILED MAY 12, 1914.
1,166,410.
Patented Dec. 28, 1915.
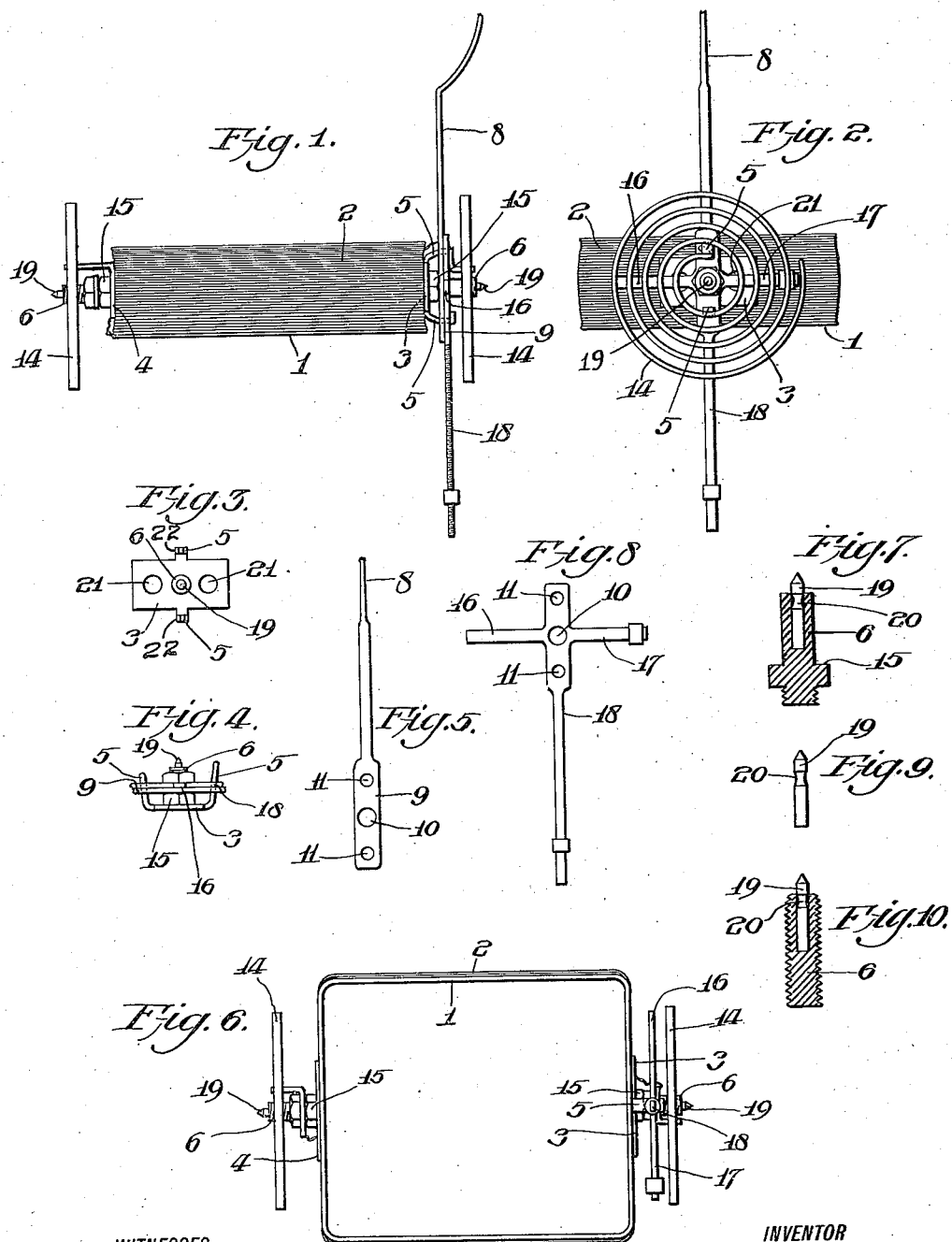

UNITED STATES PATENT OFFICE.

GEORGE W. W. CORNMAN, OF PHILADELPHIA, PENNSYLVANIA, ASSIGNOR TO THE BROWN INSTRUMENT COMPANY, OF PHILADELPHIA, PENNSYLVANIA, A CORPORATION OF PENNSYLVANIA.

ELECTRICAL INSTRUMENT.

1,166,410.   Specification of Letters Patent.   Patented Dec. 28, 1915.

Application filed May 12, 1914. Serial No. 838,159.

*To all whom it may concern:*

Be it known that I, GEORGE W. W. CORNMAN, a citizen of the United States, and a resident of the city and county of Philadelphia, State of Pennsylvania, have invented certain new and useful Improvements in Electrical Instruments, of which the following is a specification.

My invention relates to improvements in electrical instruments, and the object of my inventnion is to furnish a new and improved means for correlating and maintaining the proper relation between the several parts comprising, or carried by, the movable member or element of an electrical instrument.

Electrical instruments of certain types, the d'Arsonval for instance, are composed in part of a moving or rotating member or element which carries small hardened steel pivots which, in order to eliminate friction as much as possible, rotate or move in specially polished and ground jewels which are suitably mounted.

Secured to and forming part of the moving member is a pointer the function of which is to indicate upon a properly graduated or calibrated scale the movement of the member from its initial position. The movable member is further furnished with a counterpoise in order that it can be, as a whole, perfectly balanced to eliminate the effect of gravity upon the scale indication and to permit the instrument to be used equally well in any position, and, finally, there is attached to the moving member a restraining spring or springs which return this member to its initial position when the deflecting force is removed. It will be understood that all the above parts must occupy certain definite relations to each other and that these relations must be retained for the perfect operation and accuracy of the instrument.

While my invention will be described and illustrated in connection with an instrument of the d'Arsonval type it will be understood that I do not desire to confine it to this type of instrument alone as it, in whole or in part, may be used equally well with instruments of other types.

In the accompanying drawings forming part of this specification, and in which similar letters of reference indicate similar parts throughout the several views: Figure 1, is a side elevation of the moving element of an electrical instrument embodying my improvements: Fig. 2, an end elevation of Fig. 1: Fig. 3, an enlarged plan of the pivot base showing perforations and posts or prongs for alining and securing the pointer and counterpoise: Fig. 4, a side elevation of Fig. 3 showing the posts passing through the pointer or counterpoise: Fig. 5, a plan of the pointer holder: Fig. 6, a plan of plan of the pointer holder: Fig. 6, a plan of Fig. 1: Fig. 7, a sectional side elevation of pivot stud with collar: Fig. 8, a plan of counterpoise: Fig. 9, a side elevation of grooved pivot point: Fig. 10, a longitudinal sectional elevation of pivot stud and pivot showing the method of assembling these parts.

1 is the coil form which is, as usual, of light seamless construction and which has wound about it in the ordinary manner a fine insulated wire 2.

3—4 are pivot carrying bases which are cemented to the coil of wire 2 at opposite ends of the coil form. To assist the cement in securing the pivot bases to the coil form they are furnished with perforations 21 as shown in Fig. 3. There may be as many of these perforations as desired. One or both of the bases 3—4 carry posts or prongs 5 which are, preferably, formed integrally with them and are bent so as to project upward at right angles from them as shown best in Figs. 3 and 4.

6 are pivot posts screwed, riveted or otherwise firmly secured to the bases 3—4. These posts may be pointed at their ends to form a pivot but preferably the pivot point is a hardened polished steel piece 19 annularly grooved at 20, Figs. 4, 7, 9 and 10, carried by the posts 6 as shown. The pivot posts may carry a nut or collar 15, as shown in Figs. 4 and 7, to give them a better bearing against the bases.

8 is the pointer of the instrument which may be attached to or form part of a pointer carrier 9 which is furnished with a perforation 10 for the passage of the pivot post 6 and with perforations 11 to pass the ends of the posts or prongs 5 which are carried by the bases 3—4.

18 is the counterpoise which is also furnished with perforations 10 and 11 to pass the pivot post and the ends of posts 5. The pointer and counterpoise having been placed over the pivot post 6 and posts 5, the under one resting against shoulders formed on posts 5 or against the top of collar or nut 15 on the pivot post 6, the ends of the posts 5 are bent over against the top of the outer one to hold them in place, or they can be held in place between nuts 15—15 as shown in Fig. 4. The counterpoise 18 is furnished with arms 16—17 to which may be attached weights in order to balance the instrument.

14 is the restraining spring or springs, common to all instruments of this class, the purpose of which is to return the moving parts to their initial position when the electric current is interrupted and the coil released. These springs are carried by one of the prongs 5 of the bases 3—4 or by a strip of metal soldered to the prong.

In Fig. 1 the upper prong 5 is shown as much longer than the lower prong and after passing through and being bent over against the top of the counterpoise 18 is again bent to form the carrying support for the spring 14. In Fig. 1 the pointer is shown seated against a nut or collar 15 on the post 6, it might, however, be seated against shoulders 22, Fig. 3, formed on the prongs 5.

Having thus described my invention I claim as new and desire to secure by Letters Patent:

1. In an electrical instrument of the character described, in combination, a coil form, a coil carried by said form pivot bases, adapted to be secured to the coil at the ends of said coil form, one of said bases being furnished with an integrally formed means for engaging and steadying a pointer or counterpoise, pivot studs carried by said bases, and a pointer and a counterpoise perforated to pass said pivot and steadying means.

2. In an electrical instrument of the character described, in combination, a coil form, a coil carried by said form pivot bases, adapted to be secured to the coil at the ends of said coil form, one of said bases being furnished with integrally formed outwardly projecting posts, pivot studs carried by said bases, a pointer and a counterpoise perforated to pass said pivot stud and posts and to be carried by the latter, and a coil spring one end of which is carried by one of said posts.

GEORGE W. W. CORNMAN.

Witnesses:
JOHN W. GHEEN,
ROBERT A. ADAMS.